(12) United States Patent
Watarai

(10) Patent No.: US 8,142,312 B2
(45) Date of Patent: Mar. 27, 2012

(54) BICYCLE REAR DERAILLEUR

(75) Inventor: Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 929 days.

(21) Appl. No.: 12/166,472

(22) Filed: Jul. 2, 2008

(65) Prior Publication Data

US 2010/0004079 A1    Jan. 7, 2010

(51) Int. Cl.
*F16H 61/00* (2006.01)
(52) U.S. Cl. ........................................ 474/80
(58) Field of Classification Search .............. 474/79–83, 474/144; 403/299, 270, 282
See application file for complete search history.

(56) References Cited

U.S. PATENT DOCUMENTS

| | | | |
|---|---|---|---|
| 4,469,479 A | | 9/1984 | Ozaki |
| 4,690,663 A | * | 9/1987 | Nagano ............................ 474/80 |
| 5,836,844 A | * | 11/1998 | Yoshida ........................... 474/80 |
| 6,350,212 B1 | * | 2/2002 | Campagnolo .................... 474/80 |
| 7,189,172 B2 | * | 3/2007 | Shahana et al. ................. 474/80 |
| 2006/0105869 A1 | * | 5/2006 | Fukuda ............................ 474/80 |
| 2006/0172840 A1 | * | 8/2006 | Kamada ......................... 474/152 |
| 2006/0194660 A1 | * | 8/2006 | Shahana .......................... 474/82 |
| 2008/0026891 A1 | * | 1/2008 | Oseto .............................. 474/82 |
| 2008/0125258 A1 | * | 5/2008 | Oseto .............................. 474/80 |

* cited by examiner

*Primary Examiner* — William A Rivera
(74) *Attorney, Agent, or Firm* — Global IP Counselors, LLP

(57) ABSTRACT

A bicycle component (e.g., a rear derailleur) is basically provided with a base member and an axle. The axle includes a base supporting part supporting the base member for pivoting about a center axis of the axle and a base attaching part projecting outwardly of the base member for fixedly attachment to a bicycle frame. The base supporting part and the base attaching part overlap to define a coupling interface in which either a fixing element is disposed between the coupling interface of the base supporting part and the base attaching part or one of the base supporting part and the base attaching part is deformed with an interference fit. The base supporting part is formed of a first material with a first specific gravity. The base attaching part is formed of a second material with a second specific gravity that is higher than the first specific gravity.

23 Claims, 3 Drawing Sheets

BICYCLE REAR DERAILLEUR

BACKGROUND OF THE INVENTION

1. Field of the Invention

This invention generally relates to a bicycle rear derailleur. More specifically, the present invention relates to a B-axle of a bicycle rear derailleur.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Typically, a rear derailleur has a base member and a movable member with a chain guide movably coupled to the base member via a linkage assembly. The base member is typically coupled to the rear triangle of the bicycle frame by a bolt that forms a B-axle for providing limited rotation with respect to the bicycle frame. The chain guide is configured to move the chain laterally over a plurality of rear sprockets. The chain guide is typically coupled to the movable member by a shaft that forms a P-axle for providing limited rotation of the chain guide with respect to the movable member. The linkage assembly typically includes a pair of pivotal links pivotally coupled to both the base member and the movable member using pivot pins. A spring typically biases the chain guide to an innermost or outermost position relative to the rear sprockets. A bowden-type control cable with an outer sheath and an inner wire is typically coupled between the rear derailleur and a conventional shift control device. Thus, the chain guide can be moved laterally by moving the linkage assembly via the inner wire. Pulling the inner wire moves the chain guide against the biasing force of the spring, while releasing the inner wire causes the chain guide to move due to the biasing force of the spring.

Two examples of rear derailleurs are disclosed U.S. Pat. No. 4,469,479 and U.S. Patent Publication No. 2006/0105869. While these rear derailleurs usually work well, it is desirable to make the rear derailleur as light as possible without sacrificing strength. Typically, rear derailleurs use a steel bolt as the B-axle, which is a relatively heavy material. To reduce the weight of the B-axle, the steel bolt is sometimes partially hollow.

In view of the above, it will be apparent to those skilled in the art from this disclosure that there exists a need for an improved bicycle rear derailleur. This invention addresses this need in the art as well as other needs, which will become apparent to those skilled in the art from this disclosure.

SUMMARY OF THE INVENTION

One object of the present invention is to provide a B-axle for a bicycle rear derailleur that is relatively lightweight, but that does not sacrifice strength.

Another object of the present invention is to provide a lightweight B-axle for a bicycle rear derailleur, which is relatively simple and inexpensive to manufacture.

The foregoing objects can basically be attained by providing a bicycle component comprising a base member and an axle. The axle includes a base supporting part supporting the base member for pivoting about a center axis of the axle and a base attaching part projecting outwardly of the base member for fixedly attachment to a bicycle frame. The base supporting part and the base attaching part include overlapping portions that overlap by a prescribed axial amount in an axial direction of the axle to define a coupling interface between the overlapping portions of the base supporting part and the base attaching part in which either a fixing element is disposed between the overlapping portions of the base supporting part and the base attaching part or one of the base supporting part and the base attaching part is deformed with an interference fit. The base supporting part is formed of a first material with a first specific gravity. The base attaching part is formed of a second material with a second specific gravity that is higher than the first specific gravity.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
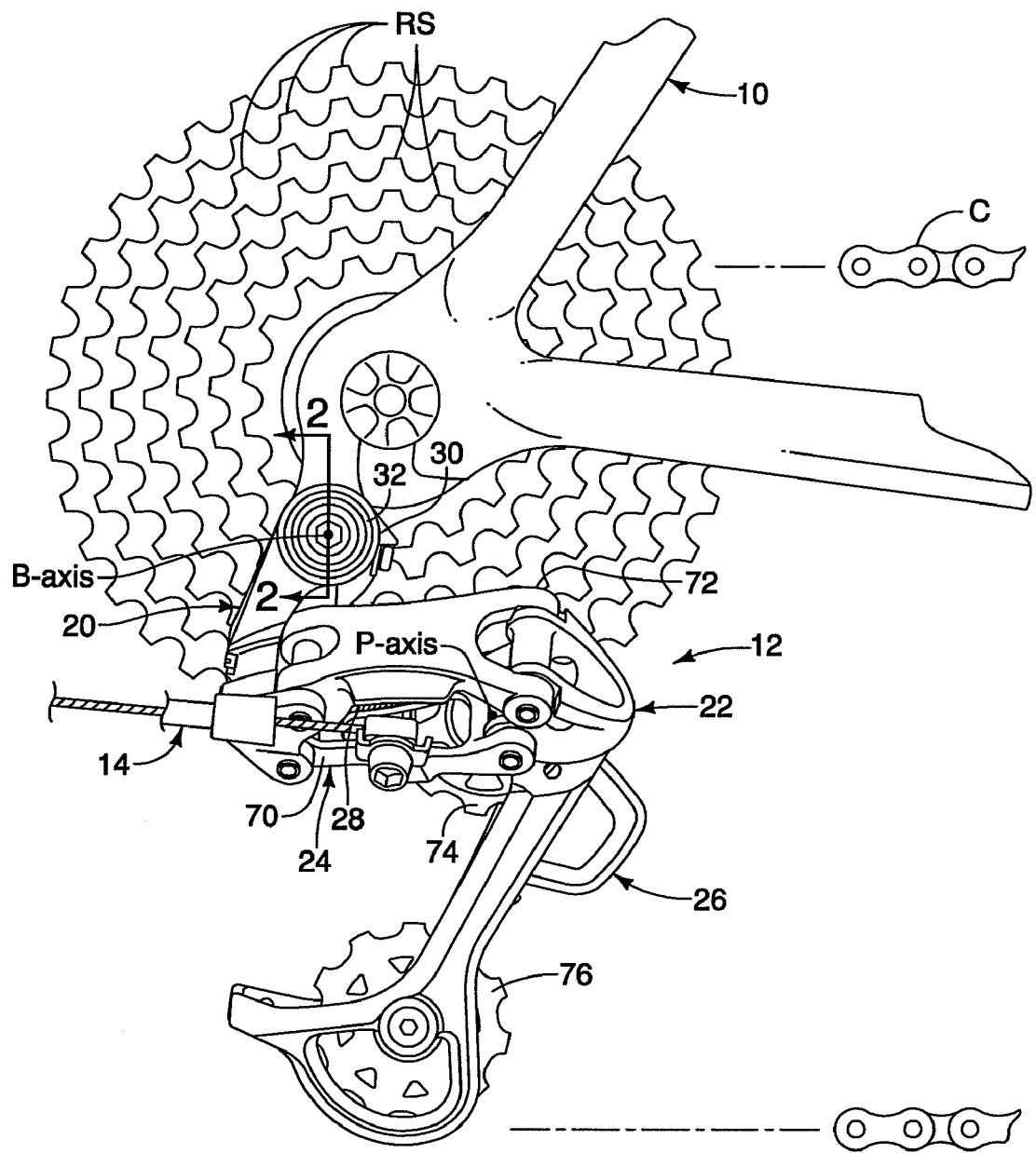
FIG. 1 is an outside elevational view of a rear portion of a bicycle having a rear derailleur mounted thereto in accordance with a first embodiment.

Referring initially to FIG. 1, a rear portion of a bicycle frame 10 is illustrated having a rear derailleur 12 mounted thereto in accordance with preferred embodiments. The rear fork or triangle of the bicycle frame 10 has a rear gear assembly (cassette) having multiple rear gears or sprockets RS rotatably coupled thereto via the rear hub (not shown). A chain C is received on the rear sprockets RS and is operatively coupled to a set of front gears or sprockets (not shown) in a conventional manner for transmitting the desired rotational torque to the rear wheel of the bicycle in a conventional manner. The rear derailleur 12 is coupled to a rear derailleur shifting mechanism (not shown) via a rear shift wire or shift cable 14 in a conventional manner. More specifically, the rear derailleur 12 is illustrated as low-normal type that is designed to be normally biased inwardly such that the chain C is normally positioned on the innermost (largest) gear or sprocket RS. Thus, when the rider actuates the rear derailleur shifting mechanism to pull the cable 14, the rear derailleur 12 moves the chain C outwardly to engage the next smaller gear. On the other hand, when the rider actuates the rear derailleur shifting mechanism (not shown) to release the cable 14, the rear derailleur 12 moves the chain C inwardly to engage the next larger gear. However, it will be apparent to those skilled in the art from this disclosure that the rear derailleur 12 could be a top-normal type if needed and/or desired.

As seen in FIG. 1, the rear derailleur 12 constitutes a bicycle component that basically includes a base member 20, a movable member 22, a linkage assembly 24, a chain guide 26, and a main biasing member 28. The base member 20 basically includes a housing portion 30 and a B-axle 32 pivotally mounted to the housing portion 30. Basically, the base member 20 is fixedly coupled to the frame 10 by the B-axle 32 for limited pivotal movement, about a B-axis while the movable member 22 is coupled to the base member 20 via the linkage assembly 24. The chain guide 26 is coupled to the movable member 22 for limited pivotal movement about a P-axis, which is parallel to the B-axis. In the illustrated embodiment, the biasing member 28 is coupled between the base member 20 and the movable member 22 of the rear derailleur 12 such that the chain guide 26 is normally biased laterally inwardly toward the largest rear sprocket RS, as mentioned above.

The basic operation of the rear derailleur 12 is well known in the prior art. Thus, the rear derailleur 12 will not be discussed or illustrated in detail herein, except as related to the B-axle 32. In other words, this disclosure will focus mainly on the B-axle 32. While the rear derailleur 12 is illustrated as a mechanical (i.e., cable actuated), it will be apparent to those skilled in the art from this disclosure that the B-axle 32 can be employed in other types of derailleurs such as motorized/electrical derailleurs, electromechanical derailleurs or pneumatic derailleurs.

Figure 2:
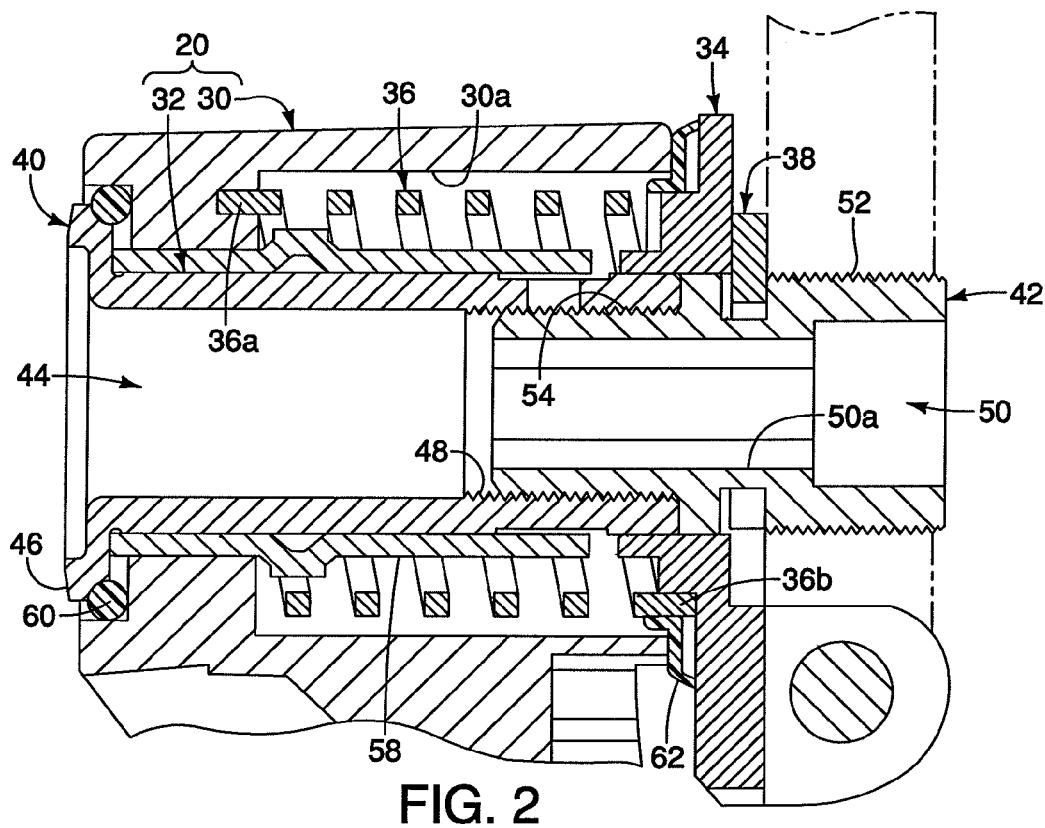
FIG. 2 is an enlarged, partial cross-sectional view of the base member and the axle assembly of the rear derailleur illustrated in FIG. 1, as seen along section line 2-2 of FIG. 1.

Referring now to FIG. 2, the base member 20 is further provided with a stopper plate 34 and a coil spring (biasing) member 36. The coil spring member 36 (e.g., a torsional coil spring) is coaxially mounted on the B-axle 32 with a first end 36a of the coil spring member 36 engaged with the housing portion 30 of the base member 20, and a second end 36b of the coil spring member 36 engaged with the stopper plate 34. A U-shaped retainer clip 38 is mounted on the B-axle 32 to retain the stopper plate 34 to the base member 20 prior to mounting of the rear derailleur 12 to the bicycle frame 10. The stopper plate 34 is secured to the B-axle 32 and to the bicycle frame 10 to control the amount of pivotal movement of the housing portion 30 relative to the bicycle frame 10.

As seen in FIGS. 1 and 2, the housing portion 30 is preferably a one-piece, unitary member formed from a lightweight, rigid material such as a metallic material or any other material that is well known in the bicycle art. The housing portion 30 is pivotally supported on the B-axle 32 for limited pivotal movement. Specifically, as seen in FIG. 2, the housing portion 30 has a stepped bore 30a with the B-axle 32 rotatably received therein. The housing portion 30 is configured and arranged to have the linkage assembly 24 pivotally coupled thereto in a conventional manner.

Figure 3:
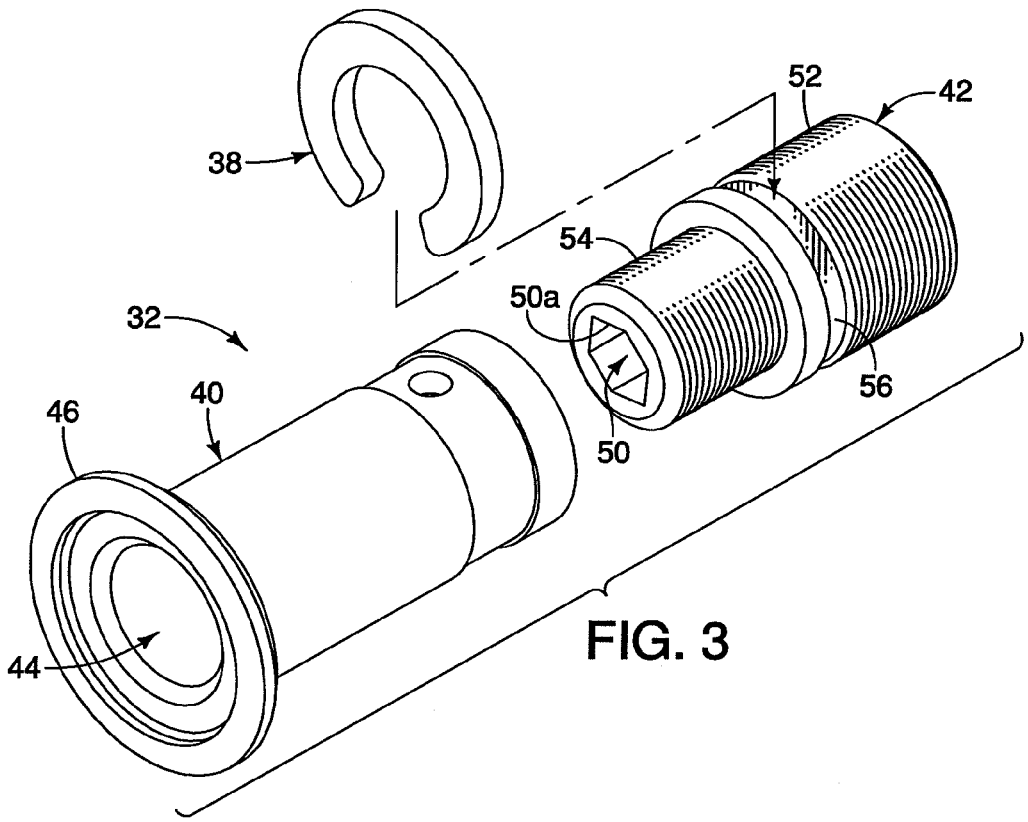
FIG. 3 is an enlarged perspective view of the B-axle of the rear derailleur illustrated in FIG. 1.
Figure 4:
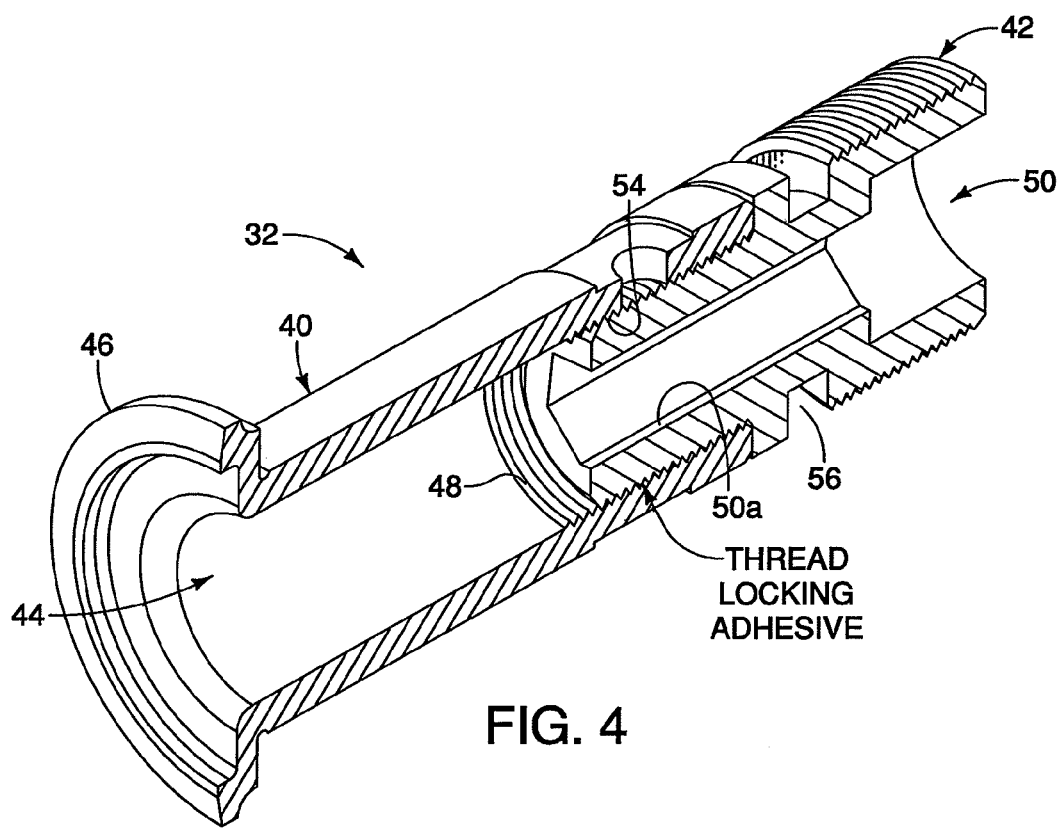
FIG. 4 is a longitudinal cross-sectional view of the B-axle illustrated in FIG. 3 as seen along section line 4-4 of FIG. 3.

As best seen in FIGS. 3 and 4, the B-axle 32 is basically a two part member that includes a base supporting part 40 and a base attaching part 42. The base supporting part 40 supports the housing portion 30 of the base member 20 for pivoting about the center B-axis of the B-axle 32. As seen in FIG. 2, the base attaching part 42 projects outwardly of the housing portion 30 of the base member 20 for fixedly attachment to the bicycle frame 10. The base supporting part 40 is formed of a first material with a first specific gravity, while the base attaching part 42 is formed of a second material with a second specific gravity that is higher than the first specific gravity of the base supporting part 40. Preferably, the base attaching part 42 is formed of primarily aluminum and the base supporting part 40 is formed of primarily steel. More preferably, the base attaching part 42 has a specific gravity within the range of 2.5 to 3.0 depending on the aluminum alloy and the base supporting part 40 has a specific gravity within the range of 7.48 to 8.0 depending on the grade of steel. Still more preferably, the base attaching part 42 is formed of aluminum with a specific gravity of 2.7 and the base supporting part 40 has a specific gravity of 7.8. If the base supporting part 40 and the base attaching part 42 were both made of steel with a specific gravity of 7.8, then the B-axle 32 would have a weight of 10.1 grams. However, when the base supporting part 40 is formed of steel with a specific gravity of 7.8 and the base attaching part 42 is formed of aluminum with a specific gravity of 2.7, then the B-axle 32 would have a weight of 7.2 grams. Thus, a weight savings of 2.9 grams can be attained by forming the base attaching part 42 of aluminum with a specific gravity of 2.7.

In the first illustrated embodiment of FIGS. 2 to 4, the base supporting part 40 is a hollow bolt-like member that is threadedly coupled to the base attaching part 42, as seen in FIGS. 2 and 4. Preferably, the base supporting part 40 is a one-piece tubular member having an axially extending through bore 44. A first end of the base supporting part 40 is provided with an annular flange 46. A second end of the base supporting part 40 is provided with an internal thread 48 for releasably coupling the base attaching part 42 thereto.

In the first illustrated embodiment of FIGS. 2 to 4, the base attaching part 42 is a one-piece tubular member that preferably has an axially extending through bore 50. The base attaching part 42 has an outer surface with a first external thread 52 and a second external thread 54 with a smaller diameter than the first external thread 52. Thus, the second external thread 54 is formed on a connecting portion of the base attaching part 42 that is disposed in the axially extending through bore 44 of the base supporting part 40. In other words, this connecting portion of the base attaching part 42 has the second external thread 54 that is threadedly engaged with the internal thread 48 of the base supporting part 40. The base attaching part 42 also has an annual recess 56 that receives the U-shaped retainer clip 38 to retain the stopper plate 34 and the coil spring member 36 on the outer surface of the B-axle 32.

As seen in FIG. 2, the first external thread 52 is dimensioned to be threaded directly into a hole 10a of a hanger portion of the frame 10. Thus, in this embodiment, the base member 20 is illustrated as being directly threadedly coupled to the frame 10 via the B-axle 32. However, it will be apparent to those skilled in the art from this disclosure that the frame 10 can include a removable derailleur hanger or hanging plate (not shown) to connect the base member 20 of the rear derailleur 12 to the frame 10. These types of derailleur hangers (not shown) are well known in the art, and thus, will not be discussed or illustrated herein.

Still referring to FIG. 2, the second external thread 54 is dimensioned to be threaded directly into the base supporting part 40 to threadedly engage the internal thread 48 of the base supporting part 40. The threads 48 and 54 of the base supporting part 40 and the base attaching part 42 form overlapping portions of the base supporting part 40 and the base attaching part 42, respectively, that overlap by a prescribed axial amount in an axial direction of the B-axle 32 to define a coupling interface between the overlapping portions of base supporting part 40 and the base attaching part 42.

Preferably, a thread locking adhesive is applied as a fixing element to one or both of the threads 48 and 54 to provide a strong bond between the thread coupling potion of the base supporting part 40 and the base attaching part 42. This thread locking adhesive along the coupling interface prevents the base supporting part 40 from unintentionally unfastening from the base attaching part 42 such as from fictional force that occurs due to the pivotal movement of the base member 20. In other words, the thread locking adhesive constitutes a fixing element disposed between the overlapping portions of the base supporting part 40 and the base attaching part 42 to prevent unintentional separation of the base supporting part 40 from the base attaching part 42.

The through bore 50 includes a non-circular tool engagement surface 50*a* in the form of a hexagonal bore. Thus, a tool such as a hex key or wrench can be inserted through the through bore 44 of the base supporting part 40 into the through bore 50 of the base attaching part 42 for contacting the tool engagement surface 50*a* to rotate the B-axle 32. Preferably, the internal thread 48 of the base supporting part 40 and the second external thread 54 of the base attaching part 42 are left hand threads and the first external thread 52 is a right hand thread.

As best seen in FIG. 2, the base member 20 further includes a tubular sleeve member 58, an O-ring 60 and a sealing ring 62. The sleeve member 58, the O-ring 60 and the sealing ring 62 are each constructed of a low-friction, slightly resilient material. The sleeve member 58 is arranged between the base supporting part 40 of the B-axle 32 and an outer side end of the housing portion 30. The O-ring 60 is arranged between the outer free end of the base supporting part 40 of the B-axle 32 and the housing portion 30. The seal ring 62 is arranged at the opposite end of the B-axle 32 from the O-ring 60 between the stopper plate 34 and the housing portion 30. The rings 60 and 62 are configured and arranged to seal opposite ends of the stepped through bore 50 of the housing portion 30.

Referring back to FIG. 1, the linkage assembly 24 basically includes inner and outer links 70 and 72. The inner and outer links 70 and 72 are pivotally coupled to the housing portion 30 of the base member 20 and pivotally coupled to the movable member 22. The linkage assembly 24 constitutes a moving mechanism coupled between the housing portion 30 of the base member 20 and the movable member 22 so that the movable member 22 is movable relative to the base member 20. The linkage assembly 24 is a relatively conventional structure, and thus, the linkage assembly 24 will not be discussed and or illustrate in detail herein.

The movable member 22 pivotally supporting the chain guide 26 in a conventional manner about the P-axis. Preferably, the movable member 22 has a housing portion with a pivot shaft or P-axle (not shown) and a coil spring member (not shown) arranged in a conventional manner with respect to the housing portion.

The chain guide 26 basically has a pair of chain cage with a guide sprocket or pulley 74 and a tension sprocket or pulley 76 that are rotatably coupled to the chain cage. The guide sprocket 74 and the tension sprocket 76 engage the chain C in a conventional manner. Accordingly, the chain guide 26 will not be discussed or illustrated in detail herein. The chain guide 26 is movably supported on the movable member 22 by the P-axle (not shown).

Figure 5:
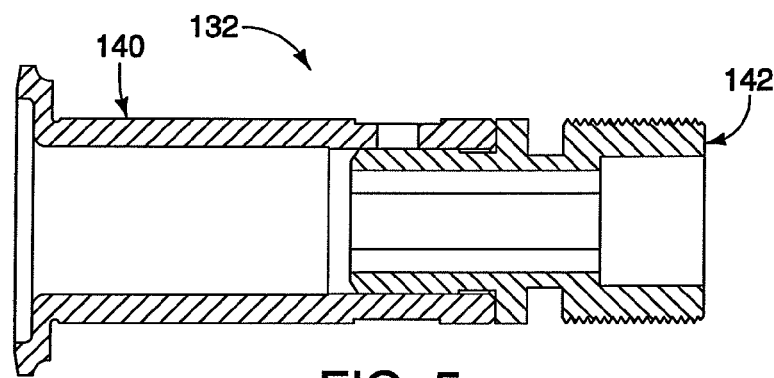
FIG. 5 is a longitudinal cross-sectional view of an alternate B-axle for use with the rear derailleur illustrated in FIG. 1.

Referring now to FIG. 5, a B-axle 132 in accordance with a second embodiment will now be explained. The B-axle 132 of this second embodiment is designed to be utilized on the rear derailleur 12 of the first embodiment, in place of the B-axle 32 of the first embodiment. In view of the similarity between the first and second embodiments, the descriptions of the parts of the second embodiment that are identical to the parts of the first embodiment will be omitted for the sake of brevity.

Basically, the B-axle 132 of FIG. 5 is basically a two part member that includes a base supporting part 140 and a base attaching part 142. The base supporting part 140 and the base attaching part 142 are identical to the base supporting part 40 and the base attaching part 42, except that the internal thread 48 of the base supporting part 40 and the second external thread 54 of the base attaching part 42 have been replaced with a press (interference) fit connection in the B-axle 132. The press fit fastens the base supporting part 140 and the base attaching part 142 together by friction after the parts 140 and 142 are longitudinally pushed together, rather than by any other means of fastening. More preferably, the friction that holds the parts 140 and 142 together is preferably increased by compression of one part against the other, which relies on the tensile and compressive strengths of the materials the parts 140 and 142 are made from.

Similar to the B-axle 32 of the first embodiment, the B-axle 132 of this second embodiment is formed such that the base supporting part 140 is formed of a first material with a first specific gravity, and the base attaching part 142 is formed of a second material with a second specific gravity that is higher than the first specific gravity of the base supporting part 140. Preferably, the base attaching part 142 is formed of primarily aluminum and the base supporting part 140 is formed of primarily steel. More preferably, the base attaching part 142 has a specific gravity within the range of 2.5 to 3.0 depending on the aluminum alloy and the base supporting part 140 has a specific gravity within the range of 7.48 to 8.0 depending on the grade of steel. Still more preferably, the base attaching part 142 is formed of aluminum with a specific gravity of 2.7 and the base supporting part 140 has a specific gravity of 7.8.

Figure 6:
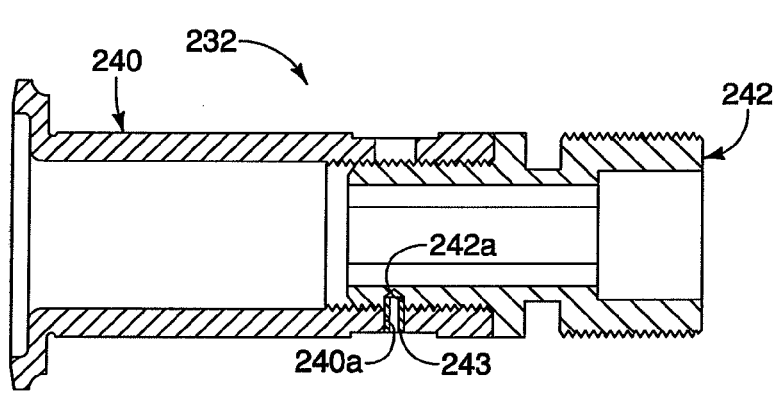
FIG. 6 is an enlarged, partial cross-sectional view of the base member with and another alternate B-axle for use with the rear derailleur illustrated in FIG. 1.

Referring now to FIG. 6, a B-axle 232 in accordance with a third embodiment will now be explained. The B-axle 232 of this third embodiment is designed to be utilized on the rear derailleur 12 of the first embodiment, in place of the B-axle 32 of the first embodiment. In view of the similarity between the first and third embodiments, the descriptions of the parts of the third embodiment that are identical to the parts of the first embodiment will be omitted for the sake of brevity. Basically, the B-axle 232 of FIG. 6 is basically a two part member that includes a base supporting part 240 and a base attaching part 242 with an addition of a locking pin 243 as a fixing element between the base supporting part 240 and the base attaching part 242. The base supporting part 240 and the base attaching part 242 are identical to the base supporting part 40 and the base attaching part 42, except that radially extending bores 240*a* and 242*a* have been added to the base supporting part 240 and the base attaching part 242, respectively. The bores 240*a* and 242*a* of the base supporting part 140 and the base attaching part 142 frictional receive the locking pin 243 by a press (interference) fit after the parts 140 and 142 are fully threaded together. More preferably, the locking pin 243 is a split pin that radially compresses when the locking pin 243 is pushed into the bores 240*a* and 242*a* of the base supporting part 140 and the base attaching part 142. Thus, the locking pin 243 constitutes a fixing element that is a radially extending element that extends radially through the bore 240*a* of the base supporting part 240 and engaging the bore 242*a* of the base attaching part 242 to prevent unintentional separation of the base supporting part 240 from the base attaching part 242.

Similar to the B-axle 32 of the first embodiment, the B-axle 232 of this third embodiment is formed such that the base supporting part 240 is formed of a first material with a first specific gravity, and the base attaching part 242 is formed of a second material with a second specific gravity that is higher than the first specific gravity of the base supporting part 240. Preferably, the base attaching part 242 is formed of primarily aluminum and the base supporting part 240 is formed of primarily steel. More preferably, the base attaching part 242 has a specific gravity within the range of 2.5 to 3.0 depending on the aluminum alloy and the base supporting part 240 has a specific gravity within the range of 7.48 to 8.0 depending on the grade of steel. Still more preferably, the base attaching part 242 is formed of aluminum with a specific gravity of 2.7 and the base supporting part 240 has a specific gravity of 7.8.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle component comprising:
   a base member; and
   an axle including a base supporting part supporting the base member for pivoting about a center axis of the axle and a base attaching part projecting outwardly of the base member for fixed attachment to a bicycle frame,
   the base supporting part and the base attaching part including overlapping portions that overlap by a prescribed axial amount in an axial direction of the axle to define a coupling interface between the overlapping portions of the base supporting part and the base attaching part in which either a fixing element is disposed between the overlapping portions of the base supporting part and the base attaching part or one of the base supporting part and the base attaching part is deformed with an interference fit,
   the base supporting part being formed of a first material with a first specific gravity and the base attaching part being formed of a second material with a second specific gravity that is higher than the first specific gravity.

2. The bicycle component according to claim 1, wherein the overlapping portions of the base supporting part and the base attaching part are threadedly coupled together, and the fixing element is a thread locking adhesive.

3. The bicycle component according to claim 1, wherein the base supporting part is a tubular member with an axially extending through bore.

4. The bicycle component according to claim 1, wherein the base attaching part is a tubular member with an axially extending through bore.

5. The bicycle component according to claim 1, wherein the base attaching part has an outer surface with a first external thread and an axially extending bore with a non-circular tool engagement surface.

6. The bicycle component according to claim 5, wherein the connecting portion of the base attaching part has a second external thread that is threadedly engaged with an internal thread of the base supporting part.

7. The bicycle component according to claim 1, wherein the base attaching part is formed of primarily aluminum and the base supporting part is formed of primarily steel.

8. The bicycle component according to claim 1, wherein the fixing element is a radially extending element that extends radially through the base supporting part and engaging the base attaching part.

9. The bicycle component according to claim 1, wherein the fixing element is a radially extending element that extends radially through the base supporting part and engaging the base attaching part.

10. The bicycle component according to claim 1, wherein the base attaching part projects inwardly into the base supporting part such that the base member overlaps with the overlapping portions in an axial direction.

11. The bicycle component according to claim 1, wherein the base attaching part has an outer surface with a first external thread and a second external thread having a smaller diameter than a diameter of the first external thread.

12. The bicycle component according to claim 1, wherein the base attaching part has an annular recess that receives a U-shaped retainer clip.

13. The bicycle component according to claim 1, wherein the overlapping portions are axially spaced, with respect to the axle, from a location at which the base attaching part fixedly attaches to the bicycle frame.

14. A bicycle component comprising:
    a base member; and
    an axle including a base supporting part supporting the base member for pivoting about a center axis of the axle and a base attaching part projecting outwardly of the base member for fixed attachment to a bicycle frame,
    the base supporting part and the base attaching part including overlapping portions that overlap by a prescribed axial amount in an axial direction of the axle to define a coupling interface between the overlapping portions of the base supporting part and the base attaching part in which either a fixing element is disposed between the overlapping portions of the base supporting part and the base attaching part or one of the base supporting part and the base attaching part is deformed with an interference fit,
    the base supporting part being formed of a first material with a first specific gravity and the base attaching part being formed of a second material with a second specific gravity that is higher than the first specific gravity, the base supporting part having an internal thread and the base attaching part having an external thread that is threadedly engaged with the internal thread of the base supporting part.

15. A bicycle rear derailleur comprising:

a base member having a housing portion and an axle pivotally mounted to the housing portion;

a movable member pivotally supporting a chain guide; and a moving mechanism coupled between the housing portion of the base member and the movable member so that the movable member is movable relative to the base member, the axle including a base supporting part supporting the housing portion of the base member for pivoting about a center axis of the axle and a base attaching part projecting outwardly of the housing portion of the base member for fixed attachment to a bicycle frame, the base supporting part and the base attaching part including overlapping portions that overlap by a prescribed axial amount in an axial direction of the axle to define a coupling interface between the overlapping portions of the base supporting part and the base attaching part in which either a fixing element is disposed between the overlapping portions of the base supporting part and the base attaching part or one of the base supporting part and the base attaching part is deformed with an interference fit, the base supporting part being formed of a first material with a first specific gravity and the base attaching part being formed of a second material with a second specific gravity that is higher than the first specific gravity.

16. The bicycle rear derailleur according to claim 15, wherein the axle is a B-axle with a coil spring member disposed on the axle with a first end of the coil spring member engaged with the housing portion of the base member, and a second end of the coil spring member engaged with a stopper plate disposed on the axle.

17. The bicycle rear derailleur according to claim 16, wherein the base attaching part is a tubular member with an axially extending through bore.

18. The bicycle rear derailleur according to claim 15, wherein the overlapping portions of the base supporting part and the base attaching part are threadedly coupled together, and the fixing element is a thread locking adhesive.

19. The bicycle rear derailleur according to claim 15, wherein the base supporting part is a tubular member with an axially extending through bore.

20. The bicycle rear derailleur according to claim 15, wherein the base attaching part has an outer surface with a first external thread and an axially extending bore with a non-circular tool engagement surface.

21. The bicycle rear derailleur according to claim 20, wherein the connecting portion of the base attaching part has a second external thread that is threadedly engaged with an internal thread of the base supporting part.

22. The bicycle rear derailleur according to claim 15, wherein the base attaching part is formed of primarily aluminum and the base supporting part is formed of primarily steel.

23. A bicycle rear derailleur comprising:

a base member having a housing portion and an axle pivotally mounted to the housing portion;

a movable member pivotally supporting a chain guide; and a moving mechanism coupled between the housing portion of the base member and the movable member so that the movable member is movable relative to the base member, the axle including a base supporting part supporting the housing portion of the base member for pivoting about a center axis of the axle and a base attaching part projecting outwardly of the housing portion of the base member for fixed attachment to a bicycle frame, the base supporting part and the base attaching part including overlapping portions that overlap by a prescribed axial amount in an axial direction of the axle to define a coupling interface between the overlapping portions of the base supporting part and the base attaching part in which either a fixing element is disposed between the overlapping portions of the base supporting part and the base attaching part or one of the base supporting part and the base attaching part is deformed with an interference fit, the base supporting part being formed of a first material with a first specific gravity and the base attaching part being formed of a second material with a second specific gravity that is higher than the first specific gravity, the base supporting part having an internal thread and the base attaching part having an external thread that is threadedly engaged with the internal thread of the base supporting part.

* * * * *